US005662550A

United States Patent [19]
Jang

[11] Patent Number: 5,662,550
[45] Date of Patent: Sep. 2, 1997

[54] HYDRAULIC CONTROL SYSTEM OF A 4-SPEED AUTOMATIC TRANSMISSION FOR VEHICLES

[75] Inventor: Jaeduk Jang, Kyungki-do, Rep. of Korea

[73] Assignee: Hyundai Motor Company, Rep. of Korea

[21] Appl. No.: 579,345

[22] Filed: Dec. 27, 1995

[30] Foreign Application Priority Data

Dec. 28, 1994 [KR] Rep. of Korea ............... 94-37993

[51] Int. Cl.$^6$ ........................... F16H 61/26
[52] U.S. Cl. ........................... 477/130; 477/143
[58] Field of Search .................. 477/121, 130, 477/131, 143, 144, 156

[56] References Cited

U.S. PATENT DOCUMENTS

| 5,014,577 | 5/1991 | Takada et al. | 477/130 |
| 5,565,000 | 10/1996 | Jang | 477/130 |
| 5,565,001 | 10/1996 | Sakai et al. | 477/143 |

FOREIGN PATENT DOCUMENTS

95-28980  11/1995  Rep. of Korea .

*Primary Examiner*—Khoi Q. Ta
*Attorney, Agent, or Firm*—Finnegan, Henderson, Farabow, Garrett & Dunner, L.L.P.

[57] ABSTRACT

If there is a need to accelerate abruptly, or shift a speed stage from a fourth speed stage to a second speed stage, to accomplish a skip shift from the fourth speed stage to the second speed stage without going via a third speed stage and, therefore, enhance the shift-responsiveness and the power performance, a high-low pressure valve which is connected to a fourth friction pressure line in the third and fourth speed stages is duty controlled by a damper clutch solenoid valve to vary a line pressure in a pressure regulating valve with the operation of a damper clutch, and a shift valve is controlled to a drive pressure passage and a third speed line pressure by controlling a first and second pressure control solenoid valves to enable the skip shift, and by supplying a first friction element with the operation pressure at times of the second to the third speed stage shifting, after the shifting to the third speed stage, when the operation pressure for the fourth friction element is supplied to a releasing valve for the fourth friction element, the operation pressure of the first friction element is exhausted.

9 Claims, 10 Drawing Sheets

| Solenoid valve / Shifting mode | Shift control solenoid valve | | First pressure control solenoid valve | | Second pressure control solenoid valve | | Remarks |
|---|---|---|---|---|---|---|---|
| | S1 | S2 | During the shifting | After the shifting | During the shifting | After the shifting | |
| N → D | OFF | ON | Duty control | OFF | Duty control | OFF | Shifting to the second speed stage |
| N → R | — | — | Duty control | OFF | OFF | OFF | |
| First speed stage | ON | ON | — | ON | — | OFF | |
| 1 → 2 | ON→OFF | ON | Duty control | OFF | OFF | OFF | |
| Second speed stage | OFF | ON | — | OFF | — | OFF | |
| 2 → 3 | OFF | ON→OFF | Duty control | OFF | — | OFF | |
| Third speed stage | OFF | OFF | — | OFF | — | OFF | Fail safe mode |
| 3 → 4 | OFF→ON | OFF | Duty control | OFF | — | OFF | |
| Fourth speed stage | ON | OFF | — | OFF | — | OFF | |
| 4 → 3 | ON→OFF | OFF | Duty control | OFF | Duty control | OFF | |
| 4 → 2 | ON→OFF | OFF→ON | ON | OFF | Duty control | OFF | |
| 3 → 2 | OFF | OFF→ON | Duty control | OFF | OFF | OFF | |
| 2 → 1 | OFF→ON | ON | ON | ON | OFF | OFF | |
| 2 → L | ON | ON | Duty control | OFF | OFF | OFF | |

HYDRAULIC CONTROL SYSTEM OF A 4-SPEED AUTOMATIC TRANSMISSION FOR VEHICLES

BACKGROUND OF THE INVENTION

1. Field of the Invention

The invention relates to a hydraulic control system of a 4-speed automatic transmission for vehicles which can perform a skip shift from fourth speed stage to second speed stage and enhance a power performance and a shift-responsiveness by means of a variable control of the line pressure.

2. Description of a Prior Art

The automatic transmission for vehicles comprises a torque converter, a shifting gear mechanism for multiple speed stages connected with the torque converter, and hydraulic-operated friction elements for selecting a speed stage according to the vehicle's travelling condition.

The torque converter includes an impeller connected to the engine crank shaft and rotating therewith, a turbine splined to the input shaft of the shifting gear mechanism and opposite to the impeller and a stator for changing the flow direction of the oil, located between the impeller and turbine.

An oil pump is provided in the input shaft of the transmission and hydraulic pressure is produced when the engine operates. The pressure is provided to each shift valve by the working of a manual valve connected with the select lever and selectively operates the friction elements according to the vehicle speed and the opening of the throttle valve.

The known hydraulic control system for the 4-speed automatic transmission provides the hydraulic lines only with the two mode pressures, i.e., the "D" range pressure and "R" range pressure, and the oil pump experiences the drive loss and the fuel consumption ratio is deteriorated.

Further, the hydraulic control system cannot perform a skip shift and the shift-responsiveness is sluggish.

A korean patent application No. 94-7336 suggests a hydraulic control system for solving the above problems.

The hydraulic control system performs the skip shift from fourth speed stage to second speed stage, however, it goes via temporarily third speed stage so that it takes long time for skip shift and the shift-responsiveness is slow.

SUMMARY OF THE INVENTION

It is an object of the invention to provide a hydraulic control system which can perform a skip shift from fourth speed stage to second speed stage without going via third speed stage and enhance the shift-responsiveness and the power performance.

The invention provides the hydraulic control system of a 4-speed automatic transmission for vehicles which comprises, a torque converter for transmitting the engine power to the transmission, an oil pump for producing a hydraulic pressure, a pressure control valve for varying a line pressure produced in the oil pump with a damper clutch by a duty operation of a damper clutch solenoid valve at times when the traveling mode is changed and, in a high speed cruising, a high-low pressure valve for varying the line pressure by operating the pressure control valve with the operation of the damper clutch by the duty operation of the damper clutch solenoid valve in the high speed cruising of a third or fourth speed stage in drive "D" range, a reducing valve for providing a reduced pressure which is lower than the line pressure, a manual valve for providing the pressure to a drive pressure passage in the "D" range and rear pressure passage in a rearward "R" range according to a port change by selection of the manual valve, a shift control valve for providing a drive pressure to each shift valve by the operation of two shift control solenoid valves which are on/off controlled by a transmission control unit according to the vehicle speed and an opening of a throttle valve and which are connected with the drive pressure passage, a rear clutch releasing valve in which the port change for providing the drive pressure to a second friction element at first, second, and third speed stages in the "D" range is made, a first pressure control valve in which the port change for providing the drive pressure to a fifth friction element at second, third, and fourth speed stages in the "D" range by a first pressure control solenoid valve is made, a second pressure control valve in which the port change for providing the drive pressure to the second friction element at first, second, and third speed stages in the "D" range by a second pressure control solenoid valve which performs a duty control is made, a 1-2 shift valve for operating a fifth friction element and providing the pressure in the rear pressure passage to a third friction element the "R" range, an end clutch valve to which the second speed line pressure is applied by the shift control valve, for controlling when the pressure for a fourth friction element is supplied resulted from the port change by the operation pressure of the first friction element, a 2-3/4-3 shift valve for providing a part of the pressure flowing through the 1-2 shift valve to the fifth friction element as an operation-releasing pressure or to the first friction element as an operation pressure by the port change resulted from third and fourth speed line pressures of the shift control valve, and a front clutch releasing valve for providing the pressure from the end clutch valve to the first friction element at the third speed range in the "D" range by the control of the operation pressure of the fourth speed friction element, or for exhausting said pressure provided to the first friction element.

PREFERRED EMBODIMENT OF THE INVENTION

Now the preferred embodiment of the invention is described in detail with reference to the attached drawings.

Figure 1:
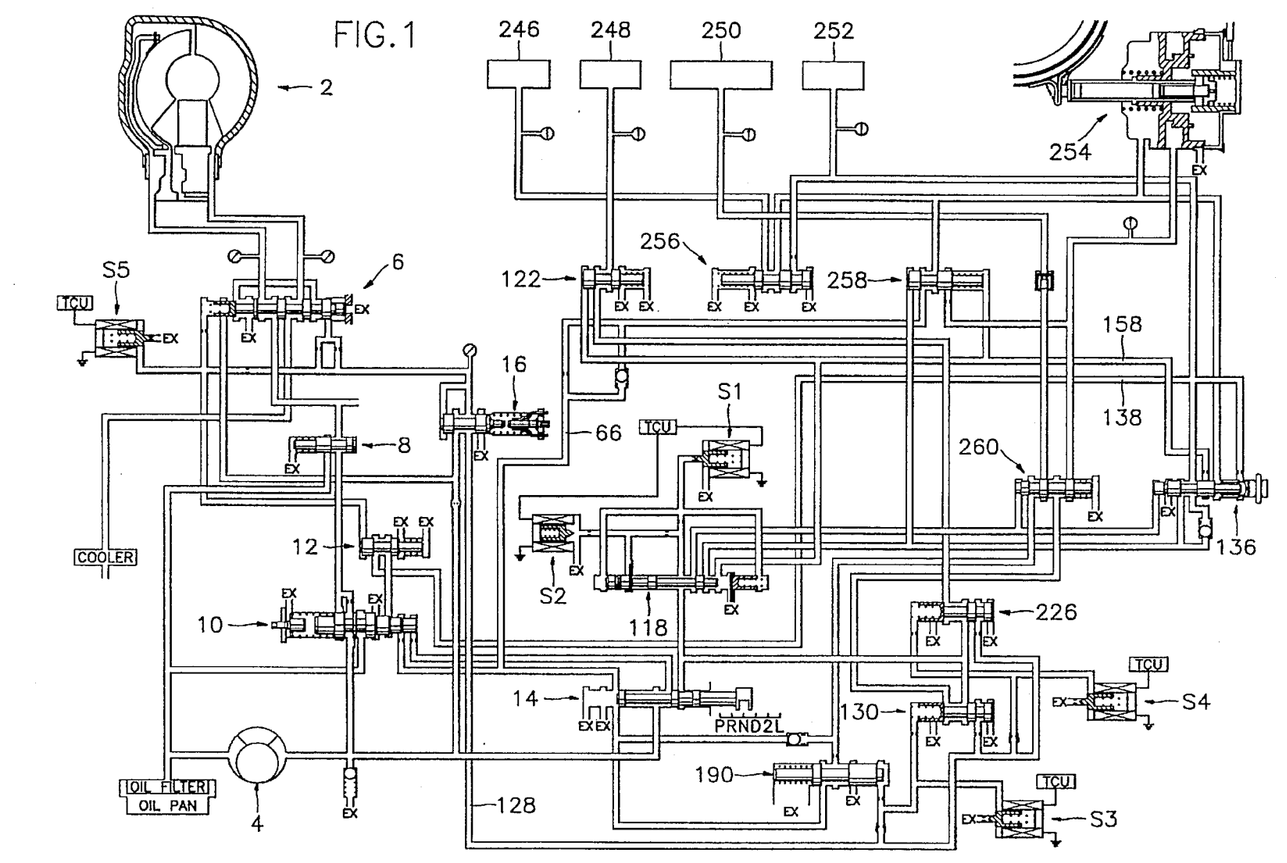
FIG. 1 is schematic view of a hydraulic control system according to the invention.

FIG. 1 is schematic view of a hydraulic control system according to the invention and illustrates the state where the select lever is selected in "N" range.

The hydraulic control system comprises a toque converter 2 for transmitting the engine power to the transmission; an oil pump 4 for producing the hydraulic pressure; a damper clutch control valve 6 for operating a damper clutch in the torque converter 2; a toque converter regulator valve 8 for regulating a torque converter pressure to constant; and a pressure regulating valve 10 for varying the line pressure when the mode is changed from "N" range to "D" range or to "R" range.

The position of the valve spool of the damper clutch control valve 6 is varied by a damper clutch solenoid valve S5 which is controlled by the transmission control unit (TCU).

The pressure regulating valve 10 regulates the line pressure and the valve spool thereof is moved by means of a high-low pressure valve 12 which is controlled by the damper clutch solenoid valve S5. The pressure regulating valve 10 is connected with the manual valve 14 and with a reducing valve 16 for producing a lower pressure than the line pressure.

Figure 2:
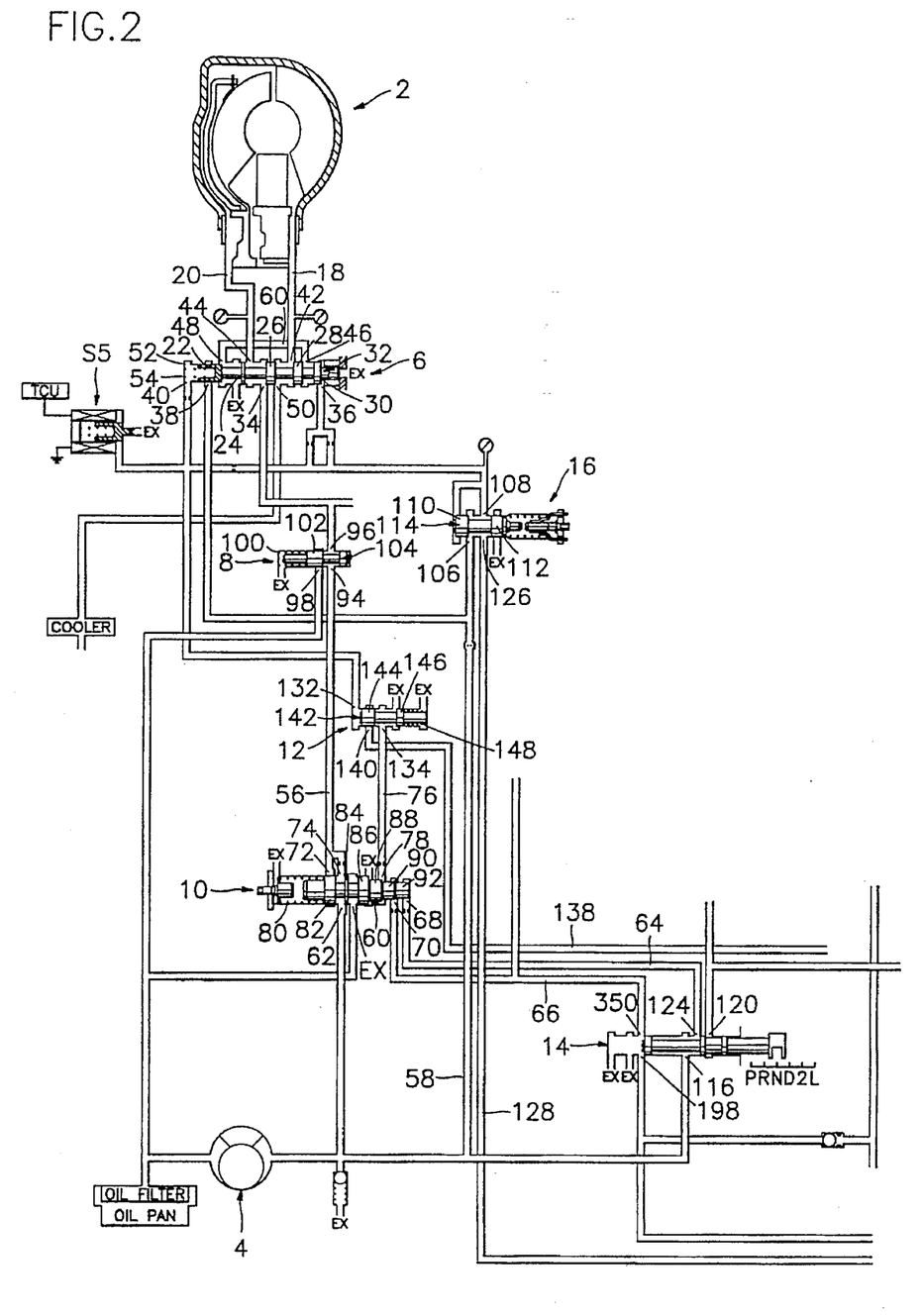
FIG. 2 is an enlarged view of a line pressure control and a damper clutch control parts according to the invention.

FIG. 2 is a enlarged view of the above-valves.

The oil pump 4 and the torque converter 2 is a general type and any kind of the oil pump and the torque converter can be used interchangeably.

The damper clutch control valve 6 is connected with the torque converter 2 via clutch operating passage 18 and clutch in-operating passage 20.

The damper clutch control valve 6 comprises a valve spool 32, which includes a first, second, third, fourth, and fifth lands 22, 24, 26, 28, 30, respectively, and a first, second, third, fourth, fifth, sixth, seventh, eighth, ninth ports, 34, 36, 38, 40, 42, 44, 46, 48, 50, respectively, all which are formed in the valve body. A pressure chamber 52 in front of the first land 22 is provided with a spring 54 to keep the valve spool 32 to right-moved position.

The first port 34 is supplied with the regulated line pressure through a passage 56 connected with the pressure regulating valve 10 and the third port 38 is supplied with the line pressure through a passage 58 connected with the oil pump 4 and the second port 36 is supplied with the reduced pressure from the reducing valve 16.

The seventh port 46 and the eighth port 48 is connected with each other via passage 60, and the fifth port 42 and the sixth port 48 are connected with the torque converter 2 through the clutch operating passage 18 and the clutch in-operating passage 20, respectively.

The pressure regulating valve 10 regulates the line pressure produced in the oil pump 4 and includes a valve body and a valve spool 60 which moves in the valve body.

The valve body includes a first port 62 connected with the line pressure passage 58, a second port 68 connected with a drive pressure passage 64, a third port 70 connected with a rear pressure passage 66, a fourth and fifth ports 72, 74 for communicating the line pressure supplied to the first port 62 with the passage 56, and a sixth port 78 connected with the high-low pressure valve 12 through a passage 76.

The valve spool 60 is elastically supported by a spring 80 and includes a first land 82 for selectively obstructing the fourth port 72, a second land 84 for exhausting the line pressure at times of the valve spool 60 being moved to left, a third land 86 for selectively obstructing the exhausting port EX, a fourth land 88 to which the pressure flowed through the sixth port 78 is applied and a fifth and sixth lands 90, 92 to which the pressure flowed through the second and third ports 68, 70, are applied, respectively.

The torque control valve 8 provided in the passage 56 communicating the pressure regulating valve 10 with the damper clutch control valve 6 includes a first, second, and third ports 94, 96, and 98, all which is formed in the valve body and includes a valve spool 104 provided with a valve land 102 for partially returning the pressure flowed through the first port 94 to the third port 98, elastically supported by a spring 100.

The reducing valve 16 provided in the line pressure passage 56 supplies the damper clutch solenoid valve 6 and the damper clutch solenoid valve S5 with the reduced pressure and includes a first port 106 connected with the line pressure passage 58, a second port 108 for supplying a part of the pressure flowed through the first port 106 to the damper clutch control valve 6 and a first and second lands 110, and 112 for varying the opening area of the first and second ports, respectively.

The line pressure passage 58 is diverged and provides the line pressure to the manual valve 14. The manual valve 14 includes a first port 116, a second port 120 for supplying a shift control valve 118 with the pressure flowed through the first port 116 at times of "D" "2" or "L" ranges being selected, and a third port 124 for supplying a rear clutch releasing valve 122 with the pressure.

A reducing pressure line 128 connected with the third port 126 of the reducing valve 16 is connected to a first pressure control valve 130 which regulates the pressure to alleviate a shifting shock occurring at times of the shifting a gear ratio being made.

The high-low pressure valve 12 is provided in the passage 76 which connects the damper clutch solenoid valve S5 with the pressure regulating valve 10 and a valve body thereof includes a first port 132 connected to the damper clutch solenoid valve S5, a second port 134 connected to the pressure regulating valve 10, and a third port 140 connected to an end clutch valve 136 through a passage 138. The valve spool thereof 142 includes a first land 144 for opening or shutting the third port 140, and a second land 146 for opening or shutting a exhausting port EX selectively, and there is a spring 148 between the second land 146 and the valve body.

Figure 3:
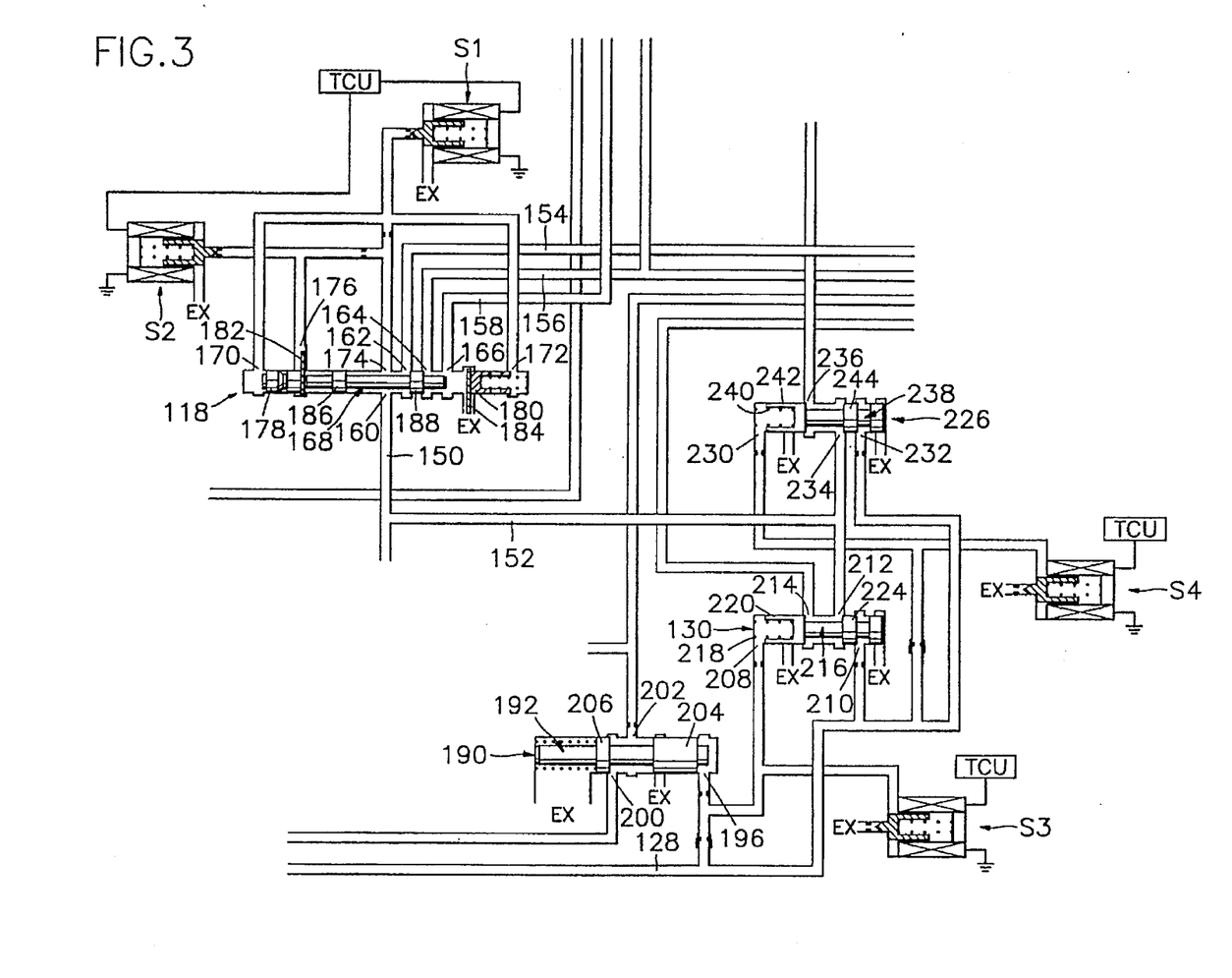
FIG. 3 is an enlarged view of a first shifting control part according to the invention.

FIG. 3 is an enlarged view of a first shifting control part according to the invention. A drive pressure passage 150 which connects the manual valve 14 with the shift control valve 118 provides its pressure to the multiple friction elements selectively by means of shift control solenoid valves S1, S2 which are on/off controlled by the TCU.

To operate the friction elements selectively, the drive pressure passage 150 is directly connected to a first speed line 152 and the shift control valve 118 is connected to a second speed line 154, a third speed line 156, and a fourth speed line 158.

The shift control valve 118 includes a first port 160, a second port 162 connected to the second speed line, a third port 164 connected to the third speed line, and a fourth port 166 connected to the fourth speed line, and also includes a fifth and sixth ports 170, and 172 for supplying the left and right of the valve spool 168 with the pressure flowed through the first port 160 to move the valve spool 168 by means of the shift control solenoid valves S1, S2. The fifth and sixth ports 170, 172 is connected to be supplied with the pressure from a seventh port 174 and the seventh port 174 supplies the pressure to a eighth port 176 to move the valve spool 168.

The fifth and sixth ports 170, 172 are provided with plugs 178, 180, respectively and the valve spool 168 moves by means of the on/off operation of the shift control solenoid valves S1, S2.

The plugs 178, 180 are limited in moving length by stoppers 182, 184 provided in the eighth port 176 and the exhausting port EX, respectively. The stoppers 182, 184 are formed by thin plates which have holes in its centre, through the holes the valve spool is inserted.

The valve spool 168 includes a first land 186 and a second land 188 having smaller area than the that of the first land 186, and the second land 188 selectively obstructs the second, third, and fourth ports 162, 164, 166.

A N-R control valve 190 communicating with the reducing pressure line 128 is provided for gradually increasing the supplying pressure to the friction element operating in "R" range to alleviate the shifting shock, and a valve spool thereof 192 is moved to left or right by the on/off duty operation of a first pressure control solenoid valve S3.

The valve spool 192 is elastically supported by a spring 194 at its left end and is kept to be in right-moved position. The N-R control Valve 192 includes a first port 196 which communicates with the reducing pressure line 128 and is supplied with the controlled pressure by the first pressure control solenoid valve S3, a second port 200 which communicates with the third port 198 of the manual valve 14 and is supplied with the line pressure, and a third port 202 for supplying the pressure flowed through the second port 200 to the shift valve.

The valve spool 192 includes a first land 204 to which the pressure through the first port 196 is applied, and a second land 206 for selectively obstructing the second port 200.

The reducing pressure line 128 is diverged and connected to a first port 208 and a second port 210 of the first pressure control valve 130 and the first port 208 is connected with the first pressure control solenoid valve S3 for controlling the hydraulic pressure.

The first pressure control valve 130 also includes a third port 212 connected with the drive pressure passage 152 and a fourth port 214 for supplying the pressure flowed through the third port 212 to the shift valve.

The valve spool 216 of the first pressure control valve 130 is elastically supported by a spring 218 and includes a first land 220 to which the pressure flowed through the first port 208 is applied and a second land 224 to which the pressure flowed through the second port 210 is applied.

A second pressure control solenoid valve S4 is provided in a passage connected to the second port 210 and controls a valve spool 228 of a second pressure control valve 226.

The pressure controlled by the second pressure control solenoid valve S4 is supplied to a first port 230 and the pressure which is not controlled is supplied to a second port 232.

The second pressure control valve 226 also includes a third port 234 connected with the first speed line 152 of the shift control valve 118 and a fourth port 236 for supplying the presser through the third port 234 to the rear clutch releasing valve 122. The valve spool thereof 238 is elastically supported by a spring 240 and includes a first land 242 to which the pressure flowed through the first port 230 is applied and a second land 244 to which the pressure flowed through the second port 232 is applied.

Figure 4:
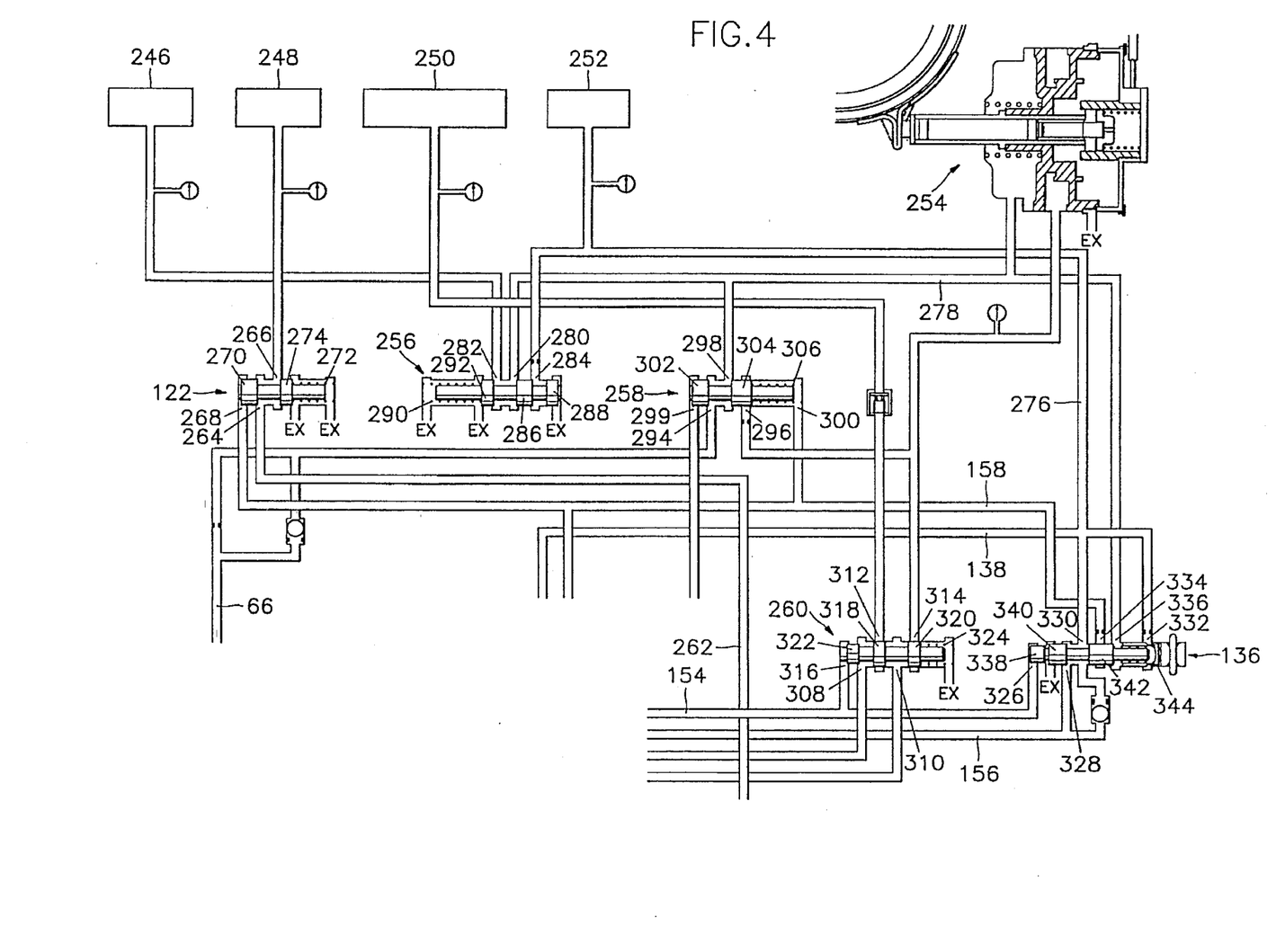
FIG. 4 is an enlarged view of a second shifting control part according to the invention.

FIG. 4 is a enlarged view of a second shifting control part according to the invention and includes the rear clutch releasing valve 122, a front clutch releasing valve 256, 2-3/4-3 shift valve 258, 1-2 shift valve 260, and the end clutch valve 136, which selectively supply the hydraulic pressure to a first friction element 246, a second friction element 248, a third friction element 250, a fourth friction element 252 and a fifth friction element 154.

The second friction element 248 for a rear clutch commonly operates in the first, second, and third speed stages at "D" range and the pressure from the second pressure control valve 226 to the rear clutch releasing valve 122, between which are connected through a passage 262, is supplied to it.

The rear clutch releasing valve 122 includes a first port 264 connected to the passage 262, a second port 266 for supplying the second friction element 248 with the pressure flowed through the first port, and a third port 268 through which the control pressure for selectively obstructing the first and second ports is supplied from the end clutch valve 136. A valve spool thereof includes a first land 270 for communicating or obstructing the first port 264 with the second port 266 and a second land 274 having a elastic element 272 for applying the force against the control pressure flowed through the third port 268.

Two exhausting ports is provided at the position where the elastic element 272 is arranged so that a negative presser is not applied when the valve spool is moved to right or left.

The fourth friction element 252 which operates in third speed stage at "D" range with the second friction element 248 is connected with the end clutch valve 136 through a passage 276 and the passage 276 supplies the pressure to the front clutch releasing valve 256 for control of it.

The front clutch releasing valve 256 which performs port change by the pressure supplied through the passage 276 is provided for temporarily operating the first friction element 246 until the fourth friction element 252 with the second friction element 248 operates, that is, the valve 256 operates the first friction element 246 in a very short time and then releasing the first friction element 246 when the fourth friction element 252 operates.

For that purpose, the front clutch releasing valve 256 includes a first port 280 connected with the 2-3/4-3 shift valve through the passage 278, a second port 282 for supplying the pressure through the first port to the first friction element 246 and a third port 284 connected with the passage 276 to which the control pressure is supplied. The valve spool thereof includes a first land for opening or shutting the first and second ports 280, 282, a second land to which the pressure flowed through the third port 284 is applied and a third land 292 in which a spring 290 is provided for supporting it.

The 2-3/4-3 shift valve 258 for supplying the pressure to the front clutch releasing valve 256 includes a first port 294 supplied with the pressure from the manual valve 14 through the line 66, a second port 296 supplied with the pressure from the 1-2 shift valve 260, and a third port 298 for selectively supplying the pressure flowed through the first and second ports to the front clutch releasing valve 256, and also includes a fourth port 300 for being supplied with the pressure from the shift control valve 118 to control a valve spool thereof. The valve spool thereof includes first land 302 for opening or shutting the first port 294 and a second land 304 for opening or shutting the second port 296, which is elastically supported by a spring 306.

A 1-2 shift valve 260 for supplying the second port of the 2-3/4-3 shift valve 258 with the hydraulic pressure includes a first port 308 supplied the pressure from the N-R control valve 190, a second port 310 supplied the pressure from the first presser control valve 130, a third port 312 for supplying the third friction element with the pressure flowed through the first port 308, a fourth port 314 for supplying the pressure flowed through the second port 310 to the fifth friction element 254 and to the 2-3/4-3 shift valve 258, and a fifth port 316 supplied the pressure from the shift control valve 118. The valve spool thereof includes a first land 318 for opening or shutting the third port 312, a second land 320 for opening or shutting the fourth port 314 and elastically supported by a spring 324, and a third land 322 to which the control pressure flowed through the fifth port 316 is applied.

The end clutch valve 136 for controlling the timing when the operation pressure is supplied to the fourth friction element 252 includes a first and second port 326, 328 which communicates with the second speed line and the third speed line 154, 156, respectively, connected with the shift control valve 118, a third port 330 for supplying the pressure supplied to the second port 328 to the fourth friction element 252, a fourth port 332 to which the pressure of the third port is partially flowed and related with the displacement of the valve spool, and a fifth port 334 which communicates with the fourth speed line 158 to supply the third port if the presser of the second port can not be supplied to the third port 330, also includes a sixth port 336 connected with the 2-3/4-3 shift valve 258 through the passage 278 for communicating the second port 328 to the third port 330.

The valve spool thereof includes a first land 338 to which the control pressure of the first port 326 is applied, a second land 340 for opening or shutting the second port 328, a third land 342 for opening or shutting the fifth port 334, and a plug 344 supported by a spring as shown in FIG. 4.

The hydraulic control system as described above according to the invention performs gear ratio shifting according to the vehicle speed and the opening of the throttling valve by means of on/off or duty control of the solenoid valves, which is controlled by the transmission control unit (TCU)

When the engine runs, the torque converter also runs and rotates the input shaft of the transmission, and, at this time, the oil pump 4 operates to produce the hydraulic pressure.

The pressure flows to the pressure regulating valve 10, the torque converter control valve 8, and the damper clutch control valve 6 along the line pressure passage 56 and also flows to the reducing valve 16 and the manual valve 14.

The pressure which flows to the pressure regulating valve 10 is flowed to the first port 62 and is supplied to the torque converter control valve 8 through the fifth port 74.

The pressure supplied to the first port 106 of the reducing valve 16 moves the valve spool 114 and produces the reduced pressure, which is lower than the line pressure, and the reduced pressure is exhausted through the second port 108 and the third port 126. The reduced pressure is supplied to the damper clutch control valve 6, high-low pressure valve 12, the first and second pressure control valve 130, 226, and the N-R control valve 190.

Figure 5:
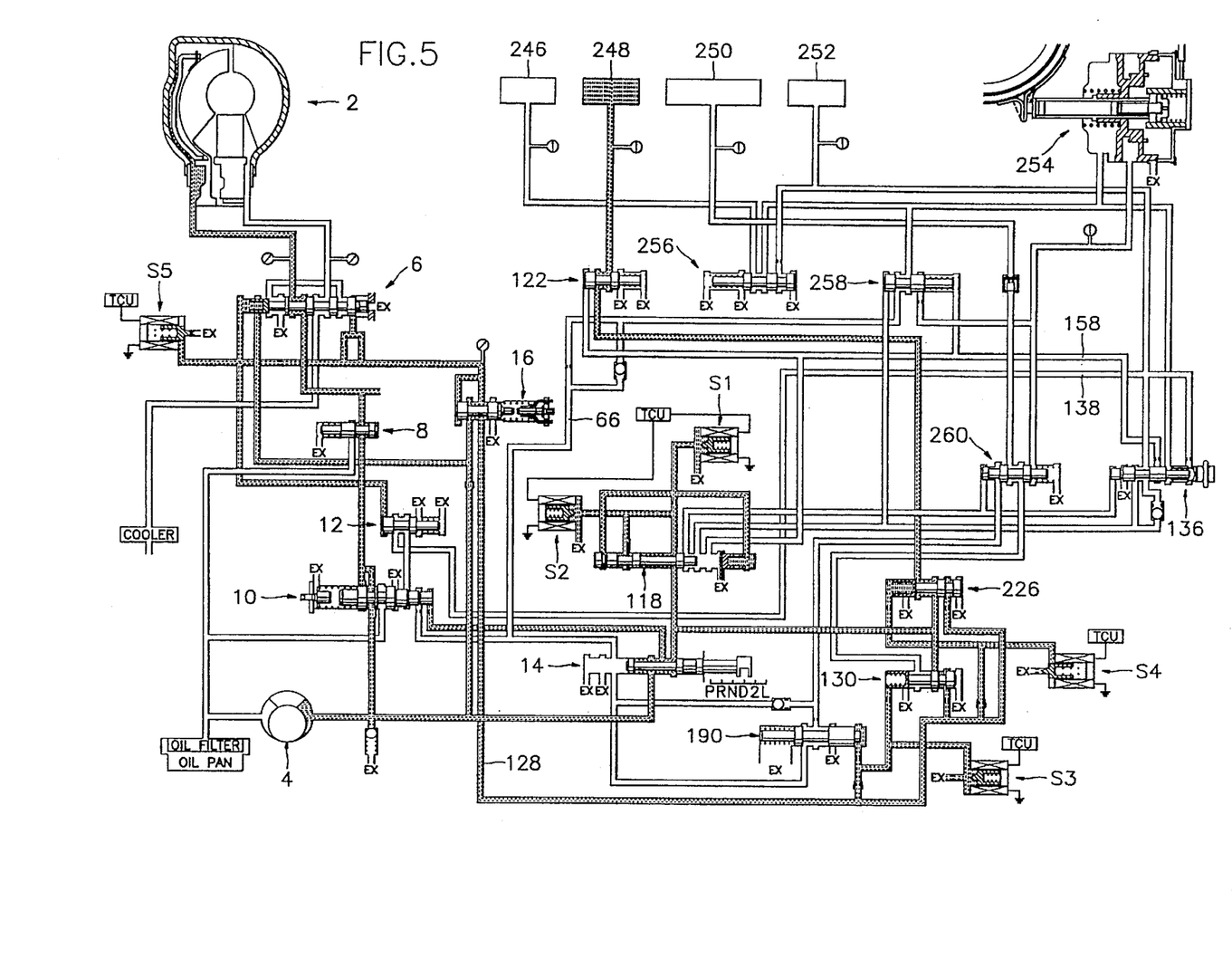
FIG. 5 is a view showing the hydraulic circuit diagram for the first speed stage in drive "D" range accordance to the invention.

At this state, if the select lever is selected to drive "D" range, the valve spool of the manual valve 14 is changed from the state as shown in FIG. 1 to the state as shown in FIG. 5. The pressure flowed to the first port 116 is supplied to the first port 160 of the shift valve 118 and to the third ports 212, 234 of the first and second pressure control valve 130, 226 through the second port 120 of the manual valve 14 and then the drive pressure passage 150. The pressure from the third port 124 of the manual valve 14 is flowed to the second port 68 of the pressure regulating valve 10 and is applied to the right side of the sixth land 92.

At this time, the transmission control unit (TCU) controls the shift control solenoid valves S1, S2 and the first pressure control solenoid valve S3 to on state, and controls the second solenoid valve S4 and damper clutch solenoid valve S5 to off state.

The above-control of these solenoid valves operates the second friction element 248 and attain the first speed stage in "D" range, and below-description explains how the hydraulic pressure is provided to the second friction element 248.

FIG. 5 is a view showing hydraulic circuit diagram for the first speed stage in drive "D" range in accordance with the invention. The regulated pressure from the pressure regulating valve 10 is supplied to the drive pressure passage 150 through the manual valve 14 and since the shift control solenoid valves S1, S2 are controlled to be in on state, the pressure flowed to the first port 166 of the shift control valve 118 do not form a pressure in the fifth, sixth, and eighth ports 170, 172, 176 and is exhausted.

Accordingly, the valve spool moves to left till reaches the stopper 182 by the pressure applied to the right side of the first land 186,and the second land 188 is located between the second port 162 and the seventh port 174.

As a result, the drive pressure do not flow to the second, third, and fourth speed lines 154, 156, 158 and flows to the first port 264 of the rear clutch releasing valve 122 through the passage diverged from the passage 150 and then the second pressure control valve 226.

At this time, the other ports of the rear clutch releasing valve 122 do not receive any pressure and the valve spool thereof is moved to left by the elastic force of the spring 272 so that the first land 270 is located in the left side of the first port 264 and the second land 274 is located in the right side of the second port 266. Accordingly, the pressure flowing along the drive pressure passage 150 is supplied to the second friction element 248 through the first port 264 and the second port 266 and the rear clutch is operated, and the first speed stage is attained.

At this time, since the pressure flowed to the first port 208 is released as a result of the high duty state (on state) control of the first pressure control solenoid valve S3 and the pressure flowed through the second port 210 is applied to the right side of the second land 224 to move the valve spool 216 to left so that the third port 212 is obstructed, the pressure flowing to the third port 212 of the first pressure control valve 130 stays at the third port 212.

Also, as the second pressure control solenoid valve S4 is controlled to the low duty state (off state), the valve spool 238 is forced to be in right-moved position by means of the pressure flowed to the first port 230 of the second pressure control valve 226 and the elastic force by the spring 240.

Figure 6:
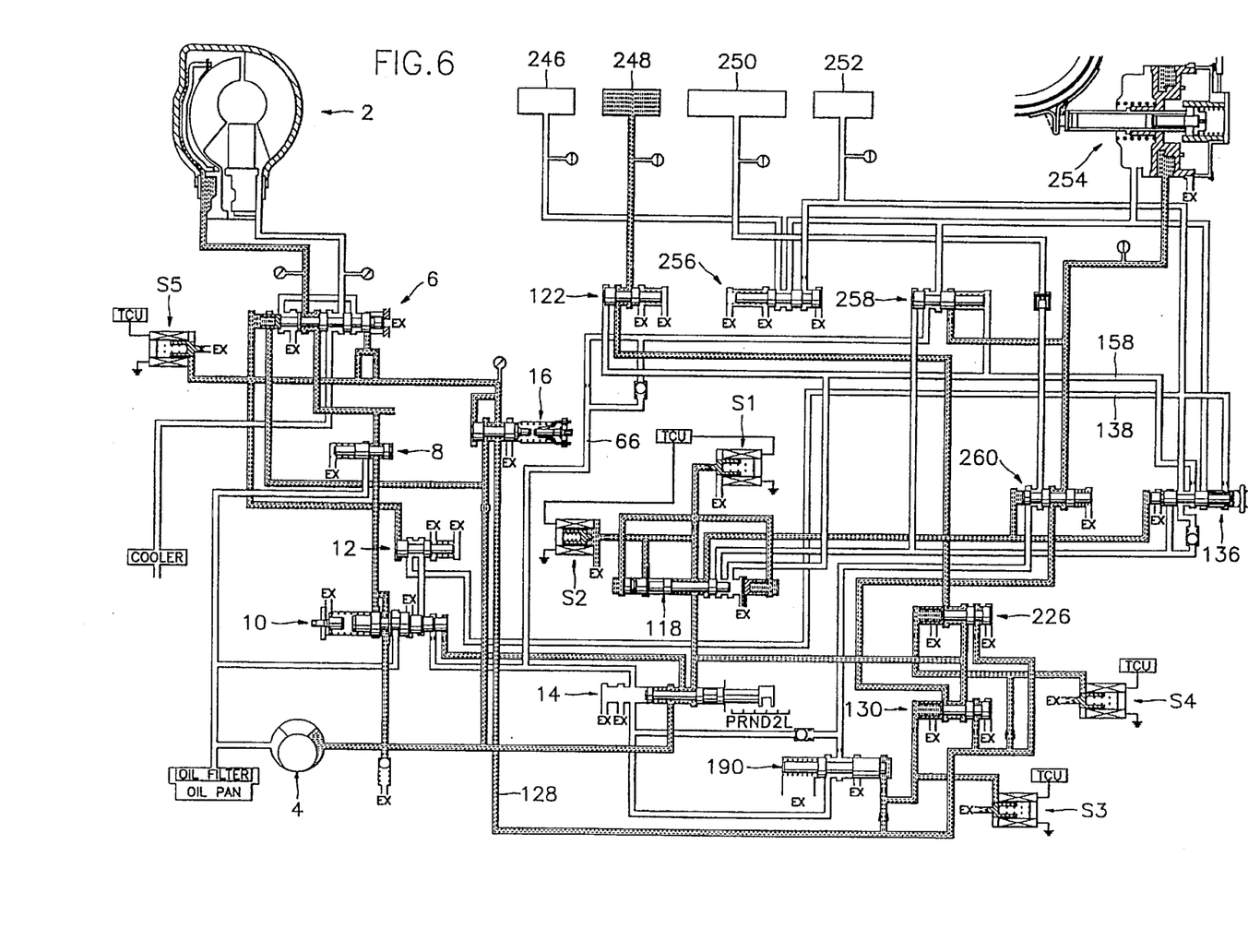
FIG. 6 is a view showing the hydraulic control circuit diagram for the second speed stage in "D" range according to the invention.

FIG. 6 is a view showing hydraulic control circuit diagram for the second speed stage in "D" range. If the vehicle speed and the opening of the throttle valve are increased from the first speed stage, the transmission control unit (TCU) controls the first shift control solenoid valve S1 to the low duty state (off state) and starts the duty-control of the first pressure control solenoid valve S3.

These controls are for attaining the second speed stage in "D" range. As the first shift control solenoid valve S1 is operated to off, the pressures in fifth and sixth ports 170, 172 of the shift control valve 118 are formed to, each, move the plugs 178, 180, each of which is positioned left and right thereof, respectively, till the position of the stoppers 182, 184.

Accordingly, the valve spool 168 in the first speed stage is moved to right so that the second land 188 is located between the second port 162 and the third port 164 and the second speed line 154 is communicated with the first port 160.

As a result, a part of the pressure flowing to the drive pressure passage is provided to the fifth port 316 of the 1-2 shift valve 260 and the first port 326 of the end clutch valve 136 through the second speed line 154 and is applied to each valve spool.

That is, the pressure flowed through the fifth port 316 of the 1-2 shift valve 260 is applied to the left side of the third land 322 to move the valve spool to right, and the pressure flowed through the first port 326 of the end clutch valve 136 is applied left side of the first land 338 to move the valve spool to right.

However, the first pressure control solenoid valve S3 is duty controlled from on state to off state and the pressure flowed through the first port 208 of the first pressure control valve 130 is gradually increased to move the valve spool 216 to right.

Accordingly, the valve spool 216 of the first pressure control valve 130 is moved from left to right and the third port 212 is communicated with the fourth port 214, and the pressure of the drive pressure passage 150 is provided to the second port 310 of the 1-2 shift valve 260.

At this time, as the valve spool of the 1-2 shift valve 260 is in the right-moved state, the second port 310 is communicated with the fourth port 314 and the drive pressure is provided to the operating chamber of the fifth friction element to operate the element.

At the same time, the second friction element 248 which also operates in the first speed stage continuously operates, and the second speed stage is attained.

Figure 7:
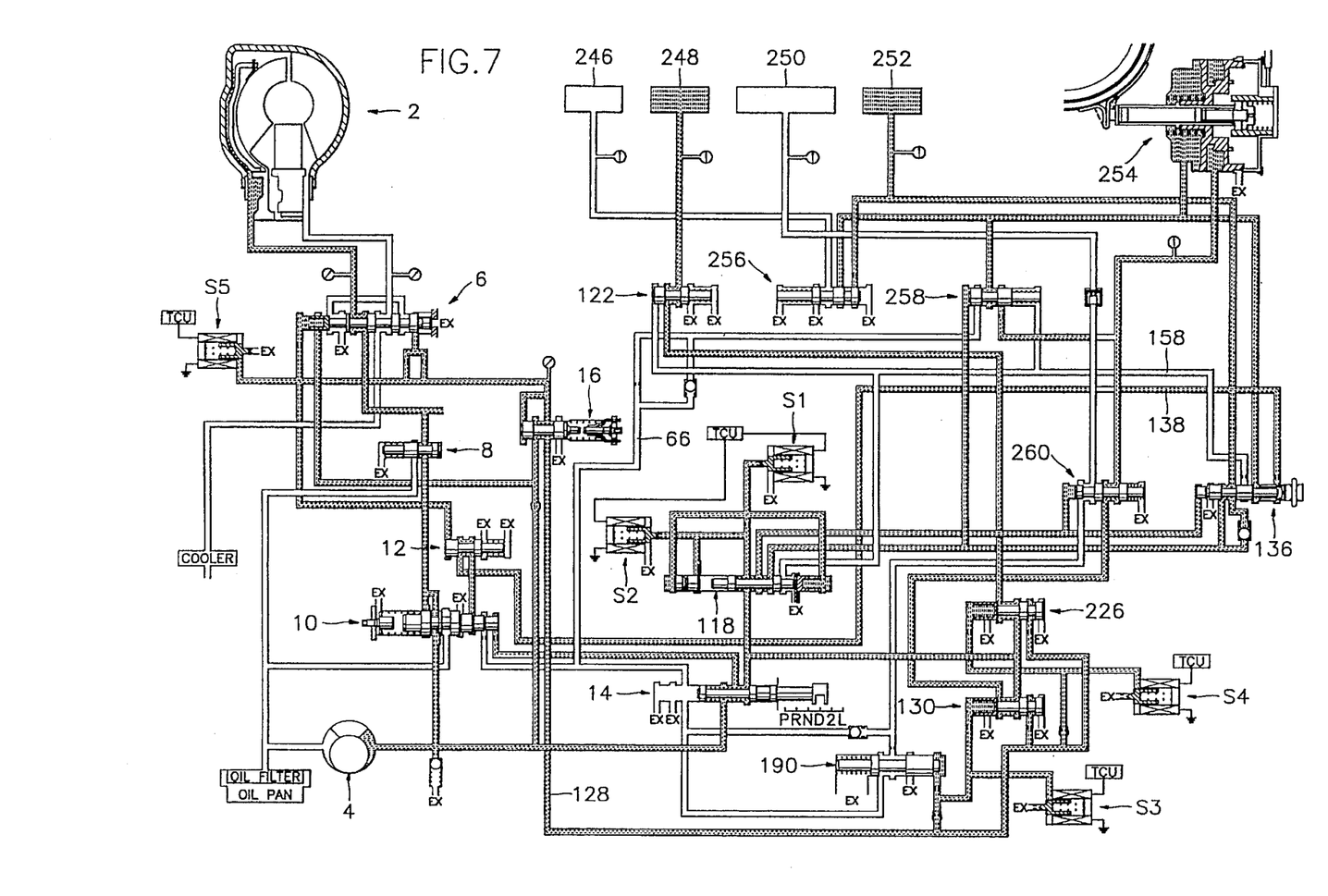
FIG. 7 is a view showing the hydraulic control circuit diagram for the third speed stage in "D" range according to the invention.

FIG. 7 is a view showing hydraulic control circuit diagram for the third speed stage in "D" range. If the vehicle speed and the opening of the throttle valve are increased from the second speed stage, the transmission control unit (TCU) controls the second shift control solenoid valve S2 to the low duty state (off state) and starts the duty-control of the first pressure control solenoid valve S3.

Accordingly, as the first and second shift control solenoid valves S1, S2 are in off state, the pressures are formed in the fifth port 170, sixth port 172 and eighth port 176 of the shift control valve 118 and the valve spool 168 is moved to contact with the plug 180 by the pressure applied to the left side of the first land 186.

As a result, the second land 188 of the valve spool 168 is located between the third port 164 and the fourth port 166 to communicate the second speed line 154 and the third speed line with the first port 160.

Therefore, the drive pressure flowed through the first port 160 is provided to the 1-2 shift valve 260 and the end clutch valve 136 and, at the same time, the third speed line pressure is provided to the fourth port 299 of the 2-3/4-3 shift valve 258, and the valve spool is moved to right to communicate the second port 296 with the third port 298.

Accordingly, the pressure from the end clutch valve 136 is provided to the first port 280 of the front clutch releasing valve 256 through the 2-3/4-3 shift valve 258.

At this time, as the valve spool of the front clutch releasing valve 256 is in right-moved state by the elastic force of the spring 290, the pressure flowed through the first port is supplied to the first friction element 246 through the second port 282.

The pressure flowed through the second port 328 of the end clutch valve 136 is supplied to the fourth friction element 252 through the third port and then the passage 276 and, at the same time, a part of the pressure is supplied to the third port 284 of the front clutch releasing valve 256.

At the same time, the pressure flowed through the third port 284 is applied to the right side of the first land 286 to move to left, and the first port 280 of the front clutch releasing valve 256 is obstructed and the second port 282 is communicated with the exhaustion port EX.

Accordingly, the pressure supplied to the first friction element 246 is promptly exhausted through the exhaustion port EX and the operation of the first friction element 246 is released. This is the method for operating the fourth friction element 252 without control after the third speed stage is accomplished by the first friction element at times of the second to third speed stage gear shifting.

After all, the third speed stage in which only the second friction element 248 and the fourth friction element 252 operate is attained and this makes advantage that the responsiveness for the 4-2 skip shift becomes faster, and in the third speed stage, the first and second shift control solenoid valves S1, S2 are in off state so that it can be used as a urgent mode if there is a trouble in the transmission control unit or electric unit.

Figure 8:
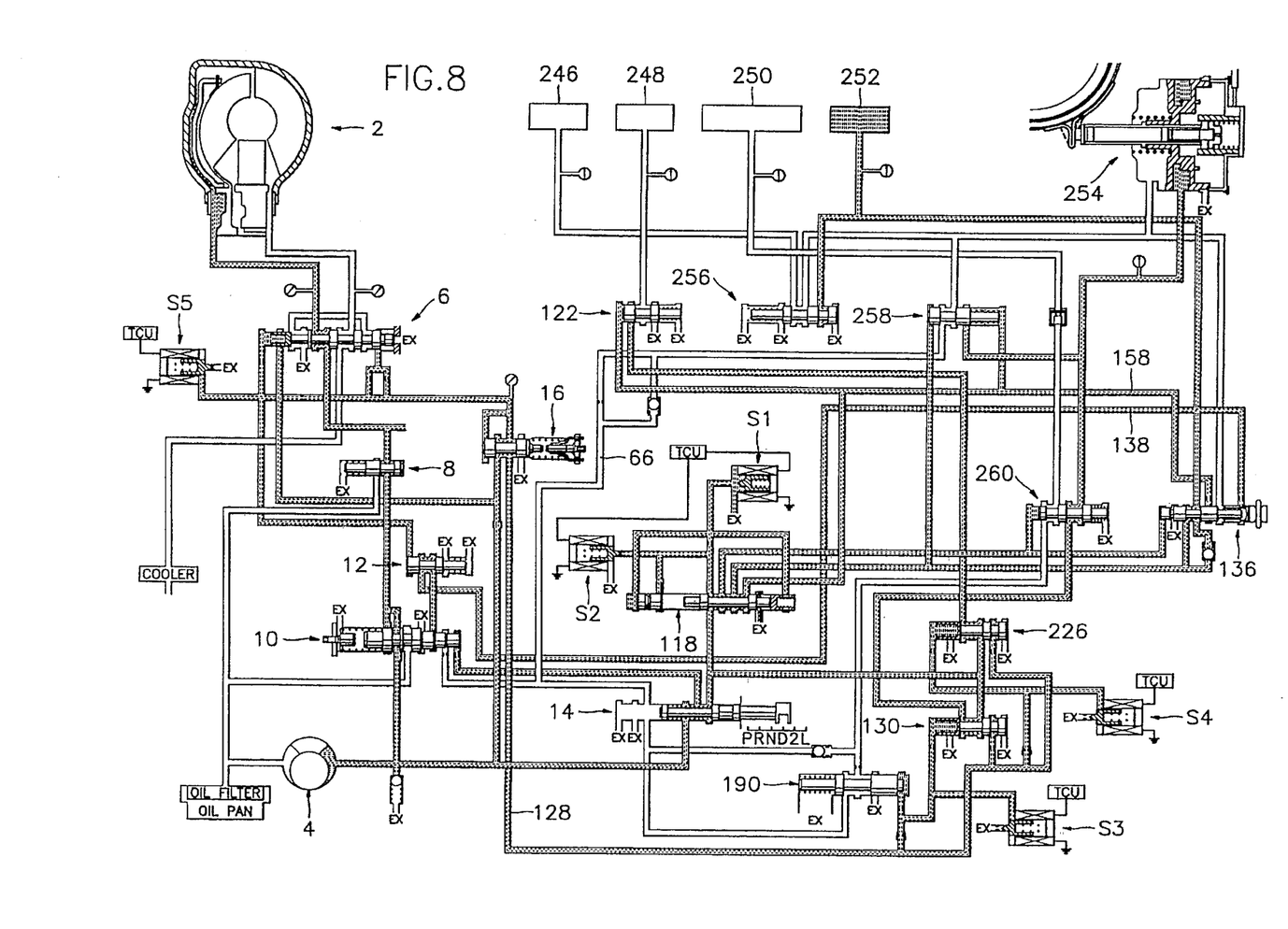
FIG. 8 is a view showing the hydraulic control circuit diagram for the fourth speed stage in "D" range according to the invention.
Figure 9:
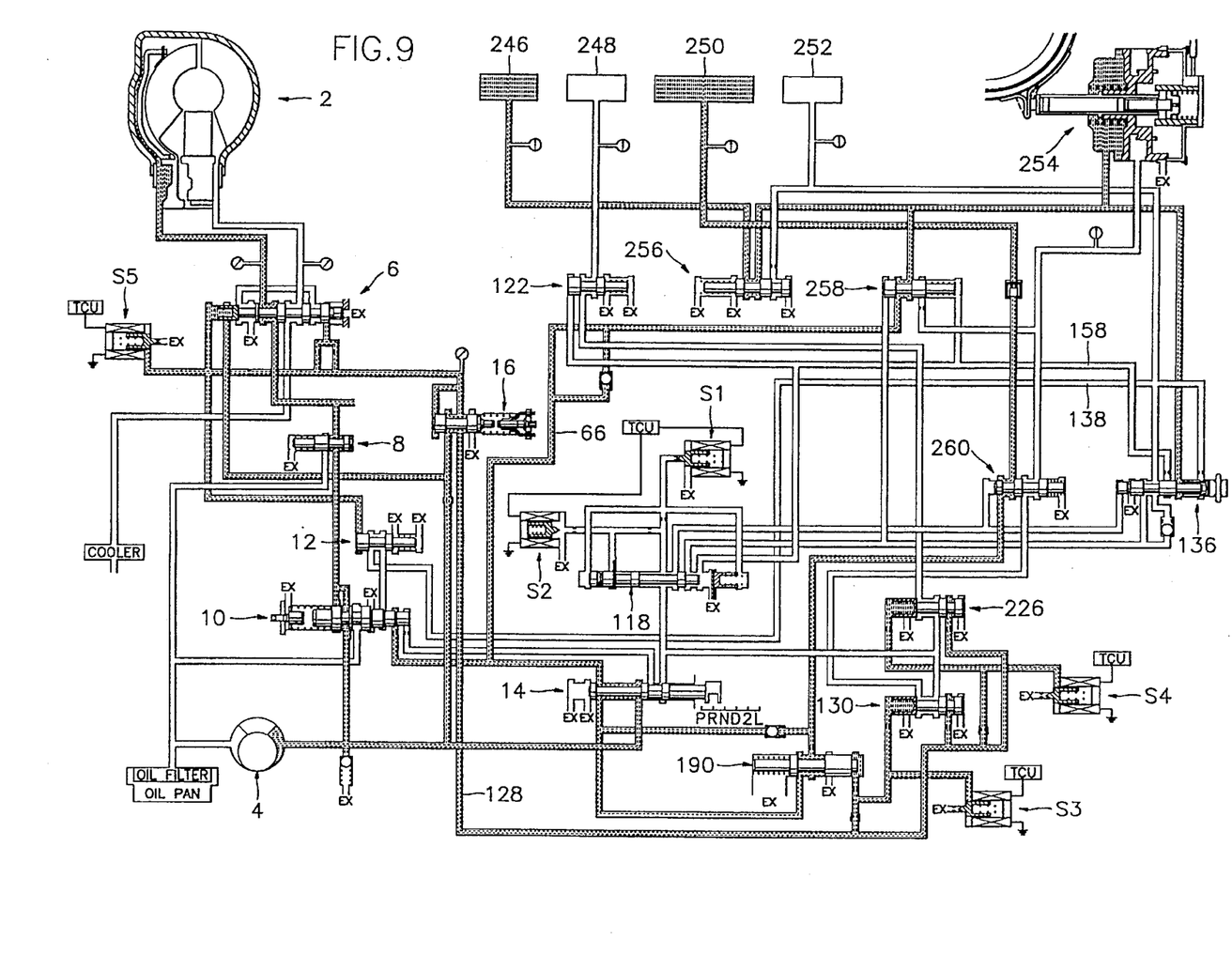
FIG. 9 is a view showing the hydraulic control circuit diagram for the rearward "R" range according to the invention.

FIG. 8 is a view showing hydraulic control circuit diagram for the fourth speed stage in "D" range. If the vehicle speed and the opening of the throttle valve are increased from the third speed stage, the transmission control unit (TCU) controls the first shift control solenoid valve S1 to on state and starts the duty-control of the first and second pressure control solenoid valves S3, S4.

Then, the pressure in the fifth port 170 and sixth port 172 of the shift control valve 118 is released and the pressure is formed only in the eighth port 176 so that the valve spool 168 thrusts the plug 180 and is moved to right.

Accordingly, the drive pressure flows to the second, third, and fourth speed line 154, 156, 158 at the same time, there is a need to operate the fourth and fifth friction elements 252, 254 and to release the operation pressure for the second friction element 248 which operates in the third speed stage to accomplish the fourth speed stage. At this time, the second friction element 248 can be released by the control of the second pressure control valve 226.

The operation of the fourth friction element 258 is accomplished as the same manner of the third speed stage, and the operation of the fifth friction element 254 is accomplished as the same manner of the second speed stage, so that the detailed description thereabout is omitted.

As for the operation pressure of the second friction element 248, the fourth speed line pressure 158 provided to the third port 268 of the rear clutch releasing valve 122 moves the valve spool to right to obstruct the first port 264 and communicate the second port 266 with the exhaustion port EX, so that the operation of the second friction element 248 is ceased, and the fourth speed stage is attained.

While the above described gear-shifting is made, the damper clutch solenoid valve S5 becomes on or off according to the operation of the torque converter control valve 8 and the torque converter 2 is directly connected to the engine or not.

The pressure supplied to the passage 138 at the third and fourth speed stages is provided to the sixth port 78 of the pressure regulating valve 10 by the control of the high-low pressure valve 12 and operates the valve spool 60 with the pressure provided to the second port 68 for controlling the line pressure, and the damper clutch solenoid valve S5 releases the damper clutch to increase the line pressure if there is a slip in the friction elements and reduces the line pressure if there is no slip. Therefore the appropriate pressure is used for shifting and the drive loss of the oil pump 4 is minimized and the fuel-consumption ratio is increased.

To perform a skip shift from fourth speed stage to the second speed stage, the operation of the fourth speed friction element 252 is ceased and the second friction element 248 operates. Therefore TCU controls the first shift control valve S1 to off state and the second shift control solenoid valve S2 to on state, and, when the shifting a gear ratio is started, controls the damper clutch solenoid valve S5 to off state.

Then the operation pressure of the fourth friction element is exhausted through the third speed line and the exhaustion port EX of the shift control valve 118 and, at the same time, is provided to the first port 264 of the rear clutch releasing valve 264 along the passage 262 from the second pressure control valve 226, so that the second friction element 248 is controlled.

Therefore, it is possible to perform the skip shift from fourth speed stage to the second speed stage without temporarily going via third speed stage and to enhance the shift-responsiveness to be faster.

Also, when the clutch operation of the second friction element is slow, by supplying the pressure to the release side of the fifth friction element and then releasing the fourth friction element, it is possible to prevent the engine from run-up.

Figure 10:
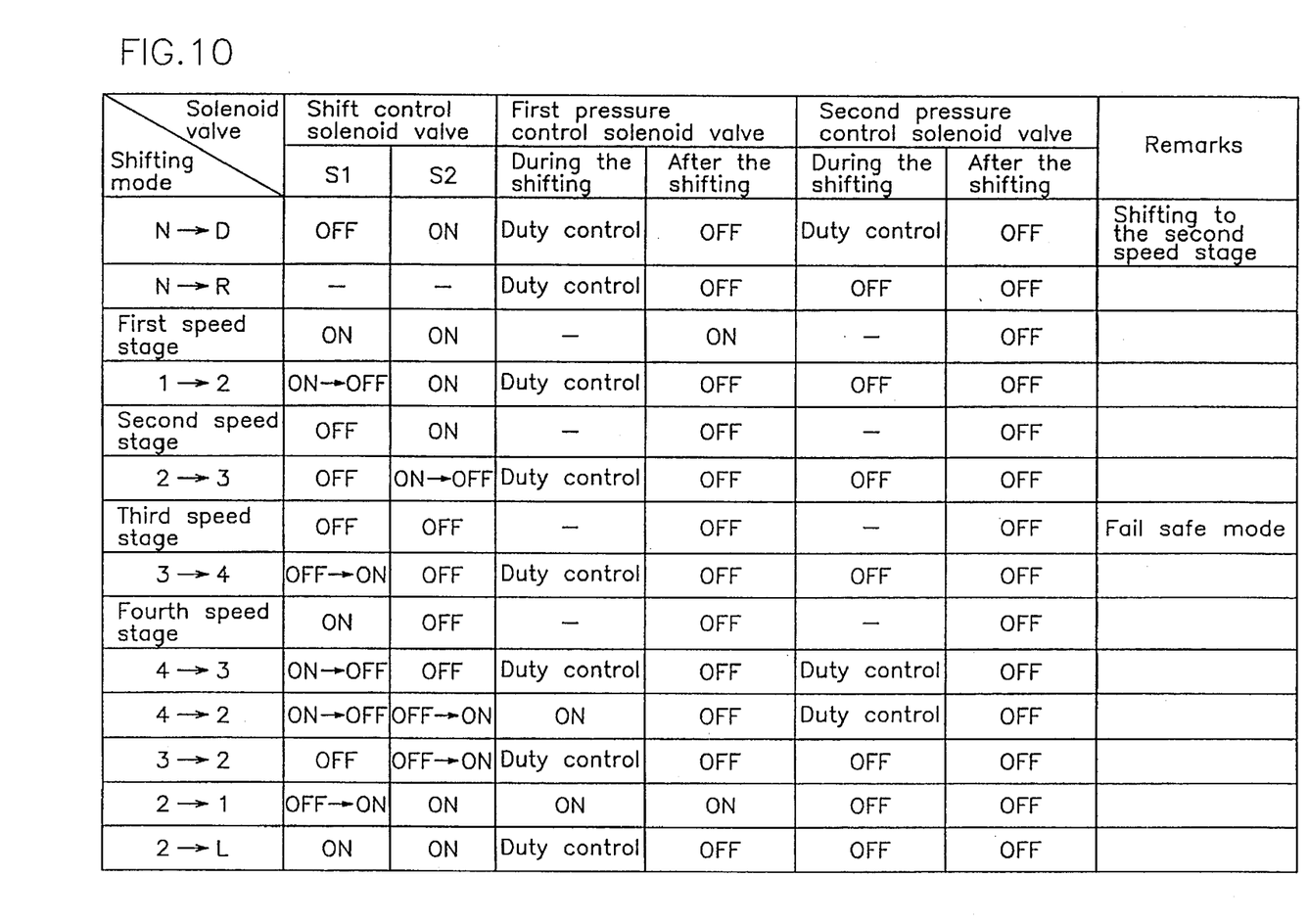
FIG. 10 is a table showing the operation of solenoid valves in respective mode according to the invention.

When the select lever is changed to reverse "R" range, the valve spool of the manual valve 14 is changed as shown in FIG. 10. The pressure produced in the oil pump 4 is provided to the first port 116 of the manual valve 14 and flows to the first port 294 of the 2-3/4-3 shift valve 258 through the fourth port 350 and the rear pressure passage 66.

At this time, the other ports of the 2-3/4-3 shift valve 258 do not receive any pressure and the valve spool thereof is moved to left by the elastic force of the spring.

Accordingly, the pressure flowed through the first port 294 is provided to the first port 280 of the front clutch releasing valve 256 through the third port 298 and then to the first friction element 246 through the second port 282.

At this time, as for the N-R control valve 190, the reduced pressure from the reducing valve 16 moves the valve spool 192 to left to communicate the second port 200 with the third port 302 by the duty control of the first solenoid valve S3 so that the pressure of the second port 200 is provided to the fourth port 312 of the 1-2 shift valve 248 to move the valve spool 308 to right, and to the third friction element 256. As a result of the operation of the third friction element, the shifting to rearward is attained.

As described above, the invention provides the hydraulic control system which can perform a skip shift from fourth speed stage to second speed stage without going via third speed stage and enhance the shift-responsiveness and the power performance.

What is claimed is:

1. A hydraulic control system of a 4-speed automatic transmission for vehicles which comprises:

a torque converter for transmitting the engine power to the transmission;

an oil pump for producing a hydraulic pressure;

a pressure control valve for varying a line pressure produced in the oil pump with a damper clutch by a duty operation of a damper clutch solenoid valve at times when the traveling mode is changed and in a high speed cruising;

a high-low pressure valve for varying the line pressure by operating the pressure control valve with the operation of the damper clutch by the duty operation of the damper clutch solenoid valve in the high speed cruising of a third or fourth speed stage in drive "D" range;

a reducing valve for providing a reduced pressure which is lower than the line pressure;

a manual valve for providing pressure to a drive pressure passage in the "D" range and a rear pressure passage in a rearward "R" range according to a port change by selection of the manual valve;

a shift control valve for providing a drive pressure to each shift valve by the operation of two shift control solenoid valves which are on/off controlled by a transmission control unit according to the vehicle speed and an opening of a throttle valve and which are connected with the drive pressure passage;

a rear clutch releasing valve in which the port change for providing the drive pressure to a second friction element at first, second, and third speed stages in the "D" range is made;

a first pressure control valve in which the port change for providing the drive pressure to a fifth friction element at second, third, and fourth speed stages in the "D" range by a first pressure control solenoid valve is made;

a second pressure control valve in which the port change for providing the drive pressure to the second friction element at first, second, and third speed stages in the "D" range by a second pressure control solenoid valve which performs a duty control is made;

a 1-2 shift valve for operating the fifth friction element, and providing the pressure in the rear pressure passage to a third friction element in said "R" range;

an end clutch valve to which the second speed line pressure is applied by said shift control valve, for controlling when the pressure for a fourth friction element is supplied resulting from the port change by the operating pressure of the first friction element;

a 2-3/4-3 shift valve for providing a part of the pressure flowing through a 1-2 shift valve to the fifth friction element as an operation-releasing pressure or to a first friction element as an operation pressure by the port change resulting from third and fourth speed line pressures of the shift control valve; and a front clutch releasing valve for either providing the pressure from the end clutch valve to the first friction element at the third speed range in the "D" range by the control of the operation pressure of the fourth speed friction element, or for exhausting said pressure provided to the first friction element.

2. A hydraulic control system of a 4-speed automatic transmission for vehicles according to claim 1, wherein the high-low pressure valve is communicated with a pressure supplying line of the fourth friction element and the valve spool thereof is moved by the operation of the damper clutch control solenoid valve so that the pressure is supplied to a pressure regulating valve to vary the line pressure.

3. A hydraulic control system of a 4-speed automatic transmission for vehicles according to claim 1, wherein the first pressure control solenoid valve is controlled to on state at the first speed stage in the "D" range to prevent the pressure in the drive pressure passage from flowing to the 1-2 shift valve and the second pressure control solenoid valve is conrolled to on state to provide the drive pressure passed through the manual valve to the second friction element through the second pressure control valve and the rear clutch releasing valve.

4. A hydraulic control system of a 4-speed automatic transmission for vehicles according to claim 1, wherein the first pressure control solenoid valve is controlled to off state at the second speed stage in the "D" range so that the pressure in the drive pressure passage is provided to the operation side of the fifth friction element through the 1-2 shift valve.

5. A hydraulic control system of a 4-speed automatic transmission for vehicles according to claim 1, wherein the shift control valve opens the second speed line to control the 1-2 shift valve for performing the skip shift from the fourth speed stage to the second speed stage so that the pressure is provided to the operation side of the fifth friction element and directly to the second friction element, and the operation pressure of the fourth friction element is exhausted to the exhaustion passage.

6. A hydraulic control system of a 4-speed automatic transmission for vehicles according to claim 1, wherein, if there is an operation-delay of the second friction element, when the skip shift from the fourth speed stage to the second speed stage is made, the shifting of the fourth speed stage to the third speed stage is made in the shift control valve and the providing to the release side of the fifth friction element is made, thereby delaying the pressure of the fourth friction element so that the skip shift from the fourth speed stage to the second speed stage is accomplished.

7. A hydraulic system of a 4-speed automatic transmission for vehicles according to claim 1, wherein the rear clutch releasing valve includes first and second ports for supplying pressure to the second friction element and a third port through which control pressure for selectively obstructing the first and second ports is supplied.

8. A hydraulic control system of a 4-speed automatic transmission for vehicles according to claim 1, wherein the 2-3/4-3 shift valve includes two control ports to which the third speed line pressure and fourth speed line pressure is flowed, respectively, a port to which the pressure in the "R" range is flowed, a port to which the pressure from the 1-2 shift valve is flowed, and a port for supplying the pressures flowed through said ports to the first and fifth friction elements.

9. A hydraulic control system of a 4-speed automatic transmission for vehicles according to claim 1, wherein the front clutch releasing valve includes a control port to which the pressure from the end clutch valve is flowed, a port to which the pressure through 2-3/4-3 shift valve is flowed, a port for supplying the pressure flowed through said port to the first friction element, and a spring for elastically supporting a valve spool to communicate the ports for rear shifting stage when the pressure is not supplied to the control port.

* * * * *